United States Patent

[11] 3,566,115

[72] Inventors Ann Swain;
Robert Sheldon, Abingdon; Geoffrey Brian Stapleton, East Hanney, England
[21] Appl. No. 712,078
[22] Filed Mar. 11, 1968
[45] Patented Feb. 23, 1971
[73] Assignee Science Research Council
London, England
[32] Priority Feb. 12, 1968
[33] England
[31] 6889/68

[54] RADIATION DOSIMETER COMPRISING A GAS-EVOLVING MATERIAL
7 Claims, 4 Drawing Figs.
[52] U.S. Cl. .................................................. 250/83
[51] Int. Cl. .................................................. G01t 1/04
[50] Field of Search ........................................ 250/83
(CD)

[56] References Cited
UNITED STATES PATENTS
3,174,036  3/1965  Alexeff ......................... 313/7X
3,253,183  5/1966  Van Oostrom ................. 313/7X OTHER REFERENCES
THE DEGRADATION OF SOLID POLYMETHYLMETHACRYLATE BY IONIZING RADIATION, by Alexander et al. from ROYAL SOCIETY OF LONDON PROCEEDINGS, VOL. 223, 1954; pgs. 392— 404. HIGH-DOSE $N_2O$ DOSIMETER, by D. A. FLORY, from NUCLEONICS, Dec. 1963, pgs. 50,52,53 and 54. 250-83CD

*Primary Examiner*—Archie R. Borchelt
*Attorney*—Larson and Taylor

ABSTRACT: A radiation dosimeter device comprising a container having a substantially constant volume, and a material within the container which material evolves a gas when irradiated by the radiation to be measured, the dose being determined by measuring the quantity or pressure of the gas after irradiation.

The material is preferably polyethylene powder or film and the quantity or pressure may be determined by a permanently connected conventional Bourdon pressure gauge or by breaking the container into a constant volume apparatus connected to a pressure gauge or by measuring the ionization produced across electrodes sealed into the container.

PATENTED FEB 23 1971  3,566,115
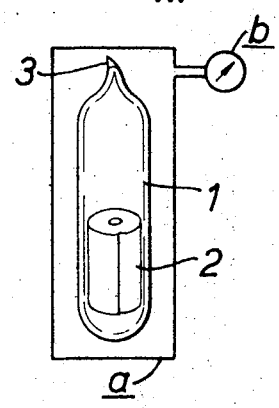
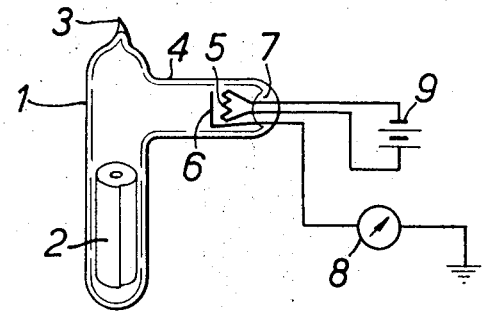
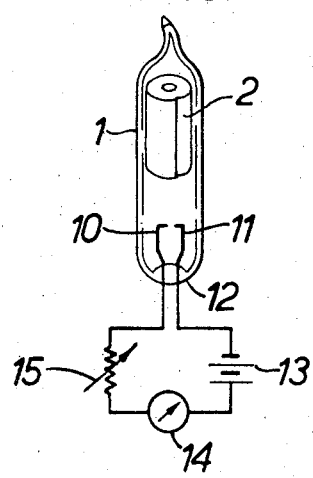
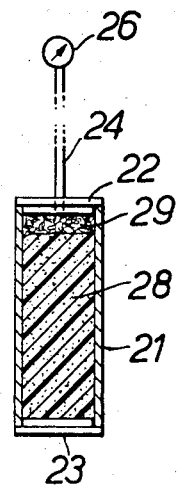

RADIATION DOSIMETER COMPRISING A GAS-EVOLVING MATERIAL

This invention relates to radiation dosimeter devices.

SUMMARY OF THE INVENTION

According to the present invention, a dosimeter device comprises a container having a substantially constant volume, and a material within the container which material evolves a gas when irradiated by the radiation to be measured, the dose being determined by measuring the quantity or pressure of the gas after irradiation.

Where the radiation to be measured is of high energy, for example, gamma or proton, said material is conveniently polyethylene in the form of powder or film, in which case the gas evolved is predominantly hydrogen. The quantity or pressure of the gas may be measured by a conventional gas pressure gauge, such as a Bourdon gauge, communicating with the interior of the container, or alternatively the container may be sealed and adapted to be placed within a constant volume apparatus connected to a pressure gauge and the container then broken to release the gas into the apparatus, whereby the quantity of the gas evolved, and hence the integrated dose, can be derived from the pressure indicated. A container adapted to be broken in this way may be of glass or silica and formed with a frangible teat.

According to a modification the container comprises a glass or like gastight envelope having electrodes within the envelope connected to terminals outside the envelope whereby the degree of ionization and hence the quantity of gas evolved from the material within the envelope may be determined.

In yet another form of the invention more suitable for higher dose rates, two simple electrodes are provided in the container to constitute a spark gap and the gas pressure is determined by measuring the potential required across the electrodes to break down the gap.

BRIEF DESCRIPTION OF THE DRAWINGS

Dosimeters in accordance with the present invention will now be described by way of example with reference to the accompanying drawing in which:

FIG. 1 is a diagrammatic view of one form of container and constant volume readout device;

FIGS. 2 and 3 are views similar to FIG. 1 of a modified forms of container connected to respective electrical readout devices; and FIG. 4 is a diagrammatic view of another form of container with a direct readout device.

DESCRIPTION OF THE PREFERRED EMBODIMENT

Referring to FIG. 1 the container comprises a glass capsule 1 containing a roll 2 of polyethylene film about 0.003 inch in thickness. The capsule is evacuated, and sealed off to form a teat 3.

In use the capsule 1 is located at the position where the dose is to be measured and when the period over which the dose is to be integrated has elapsed the capsule is removed and placed in a constant volume apparatus comprising essentially a sealable vessel $a$ connected to a pressure gauge $b$. The vessel $a$ is then evacuated and the teat of the capsule broken by, for example, jerking the vessel. It will be apparent that by making due allowance for the volume of the polyethylene and the glass of the capsule, the amount of hydrogen evolved can be derived from the pressure recorded by the apparatus. The device is suitable for use over a wide range of dose rates, and may be adapted for widely different dose ranges.

The particular device described with reference to FIG. 1 is for use over a range of 0.1 to 100 megarads, and contains about 1.0 gram of polyethylene. For measuring higher doses the amount of polyethylene is reduced, so that the pressure increase for a given dose is reduced. Naturally this leads to some loss of sensitivity at lower doses. For measuring lower doses the amount of polyethylene is increased.

Referring now to FIG. 2 the container again comprises a glass capsule or envelope 1 containing a roll 2 of polyethylene film about 0.003 inch in thickness. The envelope, however, has a branching portion 4 on the end of which is a thermionic filament 5 and collector electrode 6. Three connections to the filament and the electrode are taken out through a pinch 7. The envelope 1 is evacuated and sealed off at 3.

In use the device is exposed to radiation for the time over which the dose is to be integrated and then removed and connected to a readout device comprising, essentially, a meter 8 and a filament current source 9. The meter 8 will immediately indicate the degree of ionization and hence the quantity of gas present. This, in turn, can be shown to be proportional to the integrated dose of radiation incident upon the device. If the device is left connected to the readout device for a period of, say, 30 minutes, depending upon the pressure in the capsule the electrodes will function as an ion pump and clean up all the hydrogen. Thus the device of FIG. 2 may be reused.

The device of FIG. 2 is particularly suitable for low range dosimetry and will measure integrated doses upwards of 1 rad. For the range 1—1000 rads approximately 1 gram of polyethylene film are required but less for higher ranges.

Referring now to the embodiment of FIG. 3, the container comprises an envelope 1 containing a roll 2 of polyethene film again similar to the embodiment of FIG. 1. In one end of the envelope are two electrodes 10 and 11, connections to which are taken out of the envelope through a pinch 12.

In use the device is connected, after exposure, to a readout device comprising, essentially, a source of potential 13, a meter 14 and a variable resistance 15. The latter is adjusted to increase the potential applied across the electrodes 10 and 11 until breakdown occurs. The reading on the meter 14 will thus be a measure of the breakdown potential from which the quantity of hydrogen evolved from the polyethylene by exposure to radiation can be derived.

The embodiment of FIG. 3 is more suited to medium doses and for the range 100—10,000 rads about 1 gram of polyethylene film is required.

It will be appreciated that in either of the two immediately foregoing embodiments conventional lamp or valve techniques may be employed in the design of the electrodes and pinch and in the evacuation of the envelope.

It will also be appreciated that the devices of FIGS. 2 and 3 may be read remotely by wires extending over a considerable distance from the envelope 1 to the readout device. This is of particular advantage in the case of the reusable device of FIG. 2.

The device shown in FIG. 4 is a continuous direct reading device. It comprises a stainless steel cylinder 21, some 4 inches long and an inch in diameter, closed at the ends by end plugs 22 and 23 which are electron beam welded to the cylinder 21. The end plug 22 has an aperture communicating with a fine bore copper tube 24, which is connected to a Bourdon pressure gauge 26. During operation the cylinder 21 is arranged to be exposed to the radiation to be measured and the gauge 26 is arranged at a location where it can be safely and conveniently be read. The tube 24 may therefore be some feet in length.

The cylinder 21 is filled with polyethylene powder 28 except for a small volume adjacent to the end plug 22, where a glass fiber plug 29 is provided to prevent the polyethylene powder 28 from entering the tube 24. The polyethylene powder 28 has a large surface area to volume ratio, the individual particles being a few thousandths of an inch in diameter.

Prior to use the interior of the dosimeter is evacuated and then filled with dry hydrogen to a pressure of some 4 pounds per square inch and then sealed.

When, during, operation, the cylinder 21 is exposed to high energy radiation, such as gamma or proton, hydrogen is evolved from the polyethylene powder 28 and the resulting increase in pressure is indicated by the gauge 26. As in the above-described embodiments this indicated pressure is substantially proportional to the integrated radiation dose over a wide range of dose rates. The gauge 26 can therefore readily be calibrated to give direct readings in rads or megarads.

The particular dosimeter described with reference to FIG. 4 is for use over a range of 0 to 100 megarads, and contains about 16 grams of polyethylene powder 28. For measuring higher doses the amount of polyethylene powder is reduced, so that the pressure increase for a given dose is reduced. Naturally this leads to some loss of sensitivity at lower doses.

For measuring lower doses it is desirable that the amount of polyethylene in the cylinder 21 be increased, so that it occupies a larger fraction of the volume inside the cylinder 21 than the one-third or so occupied by the polyethylene powder 28. This cannot be done by using solid polyethylene because the diffusion of the evolved hydrogen would be so slow as to render the dosimeter useless. The desired increase can however be achieved by using a roll of polyethylene film, say 0.003 inch in thickness as in the embodiments of FIGS. 1—3.

Other methods of indicating the pressure in the containers of the invention may be used. For example, electrical resistance strain gauges may be attached to the walls of the containers, or the containers may be provided with a diaphragm the deformation of which is measured.

Materials other than polyethylene may also be used, so long as the material evolves a gas at a suitable rate when irradiated by the radiation to be measured. Hydrogen is however a particularly suitable gas to work with, and polyethylene is a very convenient material for the evolution of hydrogen under gamma radiation.

The upper temperature limit at which the devices will operate may be extended by preirradiating the polyethylene to increase its melting point. Also, the devices may be rendered sensitive to low energy neutrons by incorporating in the polyethylene an element, such as boron, which will yield secondary radiation capable of evolving hydrogen.

We claim:

1. A radiation dosimeter device comprising a container having a substantially constant volume and a solid material within the container which solid material, when irradiated by the radiation to be measured, evolves gas in a quantity related to the radiation dose, which is determined by measuring the quantity of gas after irradiation of the container.

2. A dosimeter device as claimed in claim 1 wherein said material is polyethylene in the form of a powder.

3. A dosimeter device as claimed in claim 1 wherein the device is adapted to be broken inside a constant volume apparatus to determine the quantity of gas.

4. A dosimeter device as claimed in claim 1 having electrodes within the container connected to terminals outside the container whereby the degree of ionization and hence the quantity of gas may be determined.

5. A dosimeter device as claimed in claim 1 having electrodes within the container constituting a spark gap whereby the gas pressure may be determined by measuring the potential required to break down the gap.

6. A dosimeter device as claimed in claim 1 wherein a Bourdon gauge is connected to the container for continuously indicating the pressure within the container.

7. A dosimeter device as claimed in claim 1 wherein said material is polyethylene in the form of a thin film.

Disclaimer 3,566,115.—*Ann Swain* and *Robert Sheldon*, Abingdon, and *Geoffrey Brian Stapleton*, East Hanney, England. RADIATION DOSIMETER COMPRISING A GAS EVOLVING MATERIAL. Patent dated Feb. 23, 1971. Disclaimer filed Feb. 28, 1974, by the assignee, *Science Research Council*.

Hereby enters this disclaimer to claim 1 of said patent.

[*Official Gazette October 15, 1974.*]